United States Patent [19]

Monge et al.

[11] Patent Number: 5,819,257

[45] Date of Patent: Oct. 6, 1998

[54] PROCESS FOR PROVIDING TRANSITIVE CLOSURE USING FOURTH GENERATION STRUCTURE QUERY LANGUAGE (SQL)

[75] Inventors: Daryl Lee Monge; Thomas Alan Schultz, both of Naperville, Ill.

[73] Assignee: Lucent Technologies Inc., Murray Hill, N.J.

[21] Appl. No.: 790,302

[22] Filed: Jan. 31, 1997

[51] Int. Cl.$^6$ .................................................. G06F 17/30
[52] U.S. Cl. ............................................. 707/2; 707/101
[58] Field of Search ........................... 707/1, 2, 3, 101, 707/102

[56] References Cited

U.S. PATENT DOCUMENTS 5,201,046  4/1993  Goldberg et al. ........................ 707/100

OTHER PUBLICATIONS

Teuhola, J., "Path Signatures:A Way to Speed Up Recursion in Relational Databases", IEEE, Oct. 3, 1995, pp. 446–454.

Agrawal, et al., "An Access Structure for Generalized Transitive Closure Queries", IEEE, 1993, pp. 429–438.

"Extending SQL with General Transitive Closure and Extreme Value Selections", authored by Johann Eder, IEEE Transactions on Knowledge and Data Engineering, vol. 2, No. 4, Dec. '90, pp. 381–390.

"Extending SQL with Generalized Transitive Closure", authored by Shaul Dar and Rakesh Agrawal, IEEE Transactions on Knowledge and Data Engineering, vol. 5, No. 5, Oct., '93, pp. 799–812.

"Implementing Generalized Transitive Closure in the Paradise Geographical Information System", by Biswadeep Nag, Technical Report #1272, Jun. 1995, University of Wisconsin–Madison, pp. 1–28.

*Primary Examiner*—Thomas G. Black
*Assistant Examiner*—John C. Loomis
*Attorney, Agent, or Firm*—Jack R. Penrod

[57] ABSTRACT

Any existing transitive closure in a database can be found using a method based on standard 4th Generation Structured Query Language (SQL) without non-standard extensions to perform recursion analysis. There are no requirements to stay within a preset number of levels in the database to prevent breakdown as in previous known methods. The method represents each database as a graph and builds path and edge tables which are updated as data, that is verticies and edges, are added or deleted. Since this method uses instructions that are entirely within standard 4GL SQL, it can be used over multiple platforms as long as the platforms are 4GL SQL compliant.

10 Claims, 2 Drawing Sheets

$$\begin{bmatrix} 0 & 1 & 1 & 0 & 0 & 0 \\ 0 & 0 & 0 & 0 & 0 & 0 \\ 0 & 0 & 0 & 1 & 1 & 0 \\ 0 & 0 & 0 & 0 & 0 & 1 \\ 0 & 0 & 0 & 0 & 0 & 0 \\ 0 & 0 & 0 & 0 & 0 & 0 \end{bmatrix}$$

$$\begin{bmatrix} 0 & 1 & 1 & 1 & 1 & 1 \\ 0 & 0 & 0 & 0 & 0 & 0 \\ 0 & 0 & 0 & 1 & 1 & 1 \\ 0 & 0 & 0 & 0 & 0 & 1 \\ 0 & 0 & 0 & 0 & 0 & 0 \\ 0 & 0 & 0 & 0 & 0 & 0 \end{bmatrix}$$

$$\begin{bmatrix} 1 & 1 & 1 & 1 & 1 & 1 \\ 0 & 1 & 0 & 0 & 0 & 0 \\ 0 & 0 & 1 & 1 & 1 & 1 \\ 0 & 0 & 0 & 1 & 0 & 1 \\ 0 & 0 & 0 & 0 & 1 & 0 \\ 0 & 0 & 0 & 0 & 0 & 1 \end{bmatrix}$$

$$\begin{bmatrix} 0 & 1 & 1 & 0 & 0 & 0 \\ 0 & 0 & 0 & 0 & 0 & 0 \\ 0 & 0 & 0 & 1 & 1 & 0 \\ 0 & 0 & 0 & 0 & 0 & 1 \\ 0 & 0 & 0 & 0 & 0 & 0 \\ 0 & 0 & 0 & 0 & 0 & 0 \end{bmatrix}$$

$$\begin{bmatrix} 0 & 1 & 1 & 1 & 1 & 1 \\ 0 & 0 & 0 & 0 & 0 & 0 \\ 0 & 0 & 0 & 1 & 1 & 1 \\ 0 & 0 & 0 & 0 & 0 & 1 \\ 0 & 0 & 0 & 0 & 0 & 0 \\ 0 & 0 & 0 & 0 & 0 & 0 \end{bmatrix}$$

$$\begin{bmatrix} 1 & 1 & 1 & 1 & 1 & 1 \\ 0 & 1 & 0 & 0 & 0 & 0 \\ 0 & 0 & 1 & 1 & 1 & 1 \\ 0 & 0 & 0 & 1 & 0 & 1 \\ 0 & 0 & 0 & 0 & 1 & 0 \\ 0 & 0 & 0 & 0 & 0 & 1 \end{bmatrix}$$

PROCESS FOR PROVIDING TRANSITIVE CLOSURE USING FOURTH GENERATION STRUCTURE QUERY LANGUAGE (SQL)

TECHNICAL FIELD

The invention generally relates to computer relational database systems and more particularly to methods and systems for representing and retrieving data from relational databases.

DESCRIPTION OF THE PRIOR ART

Many computer software problems today can be modeled as graph problems. One of the classical issues associated with graph problems involves determining the existence of a path between all (source, destination) vertex tuples in a graph. This is the so-called transitive closure problem. There are a number of classical approaches that involve computing the transitive closure of a graph procedurally from a list of graph edges. A number of research efforts have described extended versions of SQL that include operators that execute such procedures such as U.S. Pat. No. 5,201,046 to Goldberg et al.; *Extending SQL with Generalized Transitive Closure Functionality*, by S. Dar and R. Agrawal, published in IEEE Transactions on Knowledge and Data Engineering, Vol. 5, No. 5, Oct. 1993; *Extending SQL with Generalized Transitive Closure and Extreme Value Selections*, by J. Eder, published by IEEE Transactions on Knowledge and Data Engineering, Vol. 2, No. 4, Dec. 1990; and *Implementing Generalized Transitive Closure in the Paradise Geographical Information System*, by B. Nar, published as TR 1272, University of Wisconsin, Computer Science Department, Madison, Wis., June 1995.

Deriving the transitive closure for a given a set of vertices $\{V_1 \ldots V_n\}$ comprising the graph, G, is the transitive closure problem. The solution of the transitive closure problem refers to determining for every pair of vertices $(V_i, V_j)$ in G the existence of a path from $V_i$ to $V_j$. Determining the transitive closure of a graph can be part of many real computer database problems. For example, in using a project planning and tracking tool, a manager examining a plan may wish to compute a list of all work items that are currently late in the organization in which he or she manages. Work items captured in such a plan are typically represented as a directed graph of temporal dependencies and/or as a directed graph reflecting a functional decomposition of work items. The ability to perform this query requires computing a transitive closure, i.e. solving the transitive closure problem.

Consider the tree T as shown in FIG. 1. Tree T can be represented by a binary relation of edges as depicted in the following adjacency matrix R shown in FIG. 2. The columns and rows in the matrix represent vertices $\{V_1, \ldots V_6\}$. A value of 1 in row i column j represents the existence of an edge from $V_i$ to $V_j$. The existence of a path between any two vertices $V_i$ and $V_j$ in T can be represented by the following transitive closure matrix $R^+$, shown in FIG. 3. In FIG. 3 a value of 1 in row i column j represents the existence of a path from $V_i$ to $V_j$. If an implicit path from any vertex $V_i$ to itself is assumed, then the following matrix, $R^*$, shown in FIG. 4, represents the reflexive transitive closure of T.

The Warshall procedure is a classical process for computing the transitive closure of a directed graph of N vertices. The Warshall procedure is:

```
procedure Warshall (var edge: array [1 . . . N, 1 . . . N] of boolean);
var i, j, k: graphindex;
begin
  for i := 1 to N do
    for j := 1 to N do
      if edge[j,i] then
        for k := 1 to N do
          if edge[i,k] then
            edge[j,k] := true
  end
end;
```

Note that the procedure of Warshall is procedural and executes in $O(N^3)$ in generating the existence of all paths. Generally speaking, most real-world applications want answers to specific questions, such as 'tell me all descendants of a particular vertex $V_i$'. The $O(N^3)$ Warshall procedure is a wasteful overkill, i.e. it uses a large amount of processor time, in order to answer any specific question.

Instead of representing graph edges as a 2-dimensional array as in the Warshall procedure, a relational database procedure approach involves representing a directed graph as a set of parent-child edges in a relational database table and then using a powerful declarative programming language such as SQL in a recursive algorithm to navigate through the table. Table 1 depicts the edges in tree T shown in FIG. 1.

TABLE 1

| edge | |
|---|---|
| parent | child |
| $V_1$ | $V_2$ |
| $V_1$ | $V_3$ |
| $V_3$ | $V_4$ |
| $V_3$ | $V_5$ |
| $V_4$ | $V_6$ |

According to this database approach, the following is a typical 3GL SQL function to compute the descendants of a vertex, $V_i$, from Table 1, the edge table.

```
find_descendants(Vertex V_i) {
  EXEC SQL SELECT child INTO child FROM edge WHERE parent = V_i;
  EXEC SQL BEGIN;
    puts(child);
    find_descendants(child);
  EXEC SQL END;
}
```

This function according to this database approach is elegant and concise, but solves only one specific query involving all descendants. It does not provide the ability to ask other questions. For example, if the vertices represented tasks in a project plan and contained dates representing when each task was expected to be complete, a manager might want to pose the question "tell me all tasks that are late". Since the above function is written in 3GL, any modifications will require a recompilation of the function.

An equivalent database approach using standard 4GL SQL cannot be implemented. The reason for this is because standard 4GL SQL does not include recursion operations. Some non-standard extension is then sometimes used to provided the recursion. One such a non-standard approach is shown in U.S. Pat. No. 5,201,046 issued Apr. 6, 1993 to R. Goldberg et al. mentioned above. Another example of such non-standard SQL extensions is known from the commercial relational database system of Oracle Corporation which has a "connected by" recursive operator.

A non-recursive 4GL SQL solution can be implemented using an edge table, provided the depth of the directed graph is known in advance. The following non-recursive 4GL SQL statement computes the set of descendants of a vertex, $V_i$, from the edge table shown in Table 1.

select child
   from edge
   where parent=$V_i$
union select level2.child
   from edge level1, edge level2
   where level1.parent=$V_i$
   and level2.parent=level1.child
union select level3.child
   from edge level1, edge level2, edge level3
   where level1.parent=$V_i$
   and level2.parent=level1.child
   and level3.parent=level2.child Note the above presented algorithm has hard-coded knowledge about the fact that Tree T shown in FIG. 1 does not descend beyond 3 levels. An increase or decrease in the number of levels in T potentially breaks the algorithm.

It is an object of the present invention to provide a transitive closure, if such exists, using a non-procedural, declarative method with 4GL SQL.

It is another object of the invention to provide a method for achieving a transitive closure, if one exists, without prior knowledge of the number of required levels.

It is another object of the invention to provide a method for achieving a transitive closure, if one exists, without prior knowledge of the table and key names.

SUMMARY OF THE INVENTION

Briefly stated, in accordance with one aspect of the invention, the foregoing objects are achieved by providing a method for finding a transitive closure existing in a database by deriving and storing the transitive closure at the time that the number of edges of the graph of the database changes. Each newly derived transitive closure is stored for use in future graph queries.

In accordance with one aspect of the invention, the foregoing objects are achieved by providing a method for use with a computer having a processor, a plurality of storage elements and a display unit, for determining a transitive closure between two verticies of a tree graph in standard SQL which includes the steps of determining all verticies of the tree graph, determining an edge table from all of the verticies, deriving a path table from the verticies and the edge table, and from the path table determining at least one transitive closure path between the two if such transitive closure exists.

In accordance with another aspect of the invention, the foregoing objects are achieved by providing a method for use with a computer having a processor, a plurality of storage elements and a display unit, for determining a transitive closure between two verticies of a directed acyclic graph in standard SQL which includes the steps of determining all verticies of the directed acyclic graph, determining an edge table from all of the verticies, deriving a path table from the verticies and the edge table, and from the path table determining at least one transitive closure path between the two if such transitive closure exists.

DETAILED DESCRIPTION

Figures 1, 2, 3, 4:
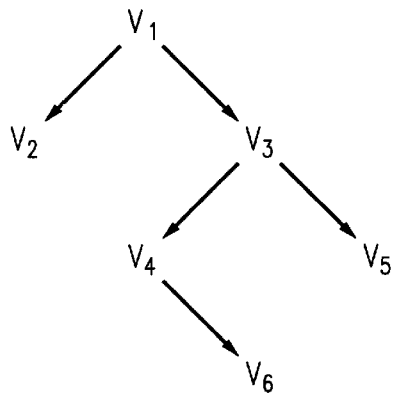
FIG. 1 is a diagram of a tree of verticies.
FIG. 2 is an edge table of the tree shown in FIG. 1.
FIG. 3 is a table showing by binary representation the transitive closures between the verticies of the tree shown in FIG. 1.
FIG. 4 is a table showing by binary representation the reflective closures between the verticies of the tree shown in FIG. 1.

Referring again to FIG. 1, the reflexive transitive closure of tree T according to the present invention can be represented by path table 2. Each record represents the existence of a path from a source vertex to a destination vertex.

TABLE 2

| path | |
|---|---|
| source | destination |
| $V_1$ | $V_2$ |
| $V_1$ | $V_2$ |
| $V_1$ | $V_3$ |
| $V_1$ | $V_4$ |
| $V_1$ | $V_5$ |
| $V_1$ | $V_6$ |
| $V_2$ | $V_2$ |
| $V_3$ | $V_3$ |
| $V_3$ | $V_4$ |
| $V_3$ | $V_5$ |
| $V_3$ | $V_6$ |
| $V_4$ | $V_4$ |
| $V_4$ | $V_6$ |
| $V_5$ | $V_5$ |
| $V_6$ | $V_6$ |

This innovative representation of reflexive transitive closure permits a standard SQL statement to now be written to derive the descendants of a vertex, $V_i$, as follows.

select destination from path where source=$V_i$

It is noteworthy that the query immediately above does not break if vertices are added to or deleted from the graph. This query has the advantage of always being correct regardless of the number of levels added or deleted.

Having explained the value of representing the reflexive transitive closure of a directed graph as a table in a relational database, it will be appreciated that powerful general queries can be written using standard SQL. Such queries require little or no maintenance because unlike the known methods, hard-coded knowledge about the corresponding graph does not have to be specified in the queries. The challenge that remains, however, is providing the ability to maintain the reflexive transitive closure of such a graph as vertices and edges are added to and deleted from a graph.

The maintenance operations that are commonly necessary include: creating a vertex, creating an edge, deleting an edge, and deleting a vertex. Each of these four maintenance operations will be described below in the context of examining trees and directed acyclic graphs using the path and edge tables, i.e. Tables 2 and 1 respectively.

Creating a New Vertex in a Tree

Creating a new vertex in a tree requires one record inserted into the path table (Table 2) as follows.
insert into path (source, destination) values ($V_i$, $V_j$)

Creating an Edge in a Tree

Creating an edge in a tree between vertices and requires an insertion into the edge table (Table 1) as follows.
insert into edge (parent, child) values ($V_i$, $V_j$)

Figure 5:
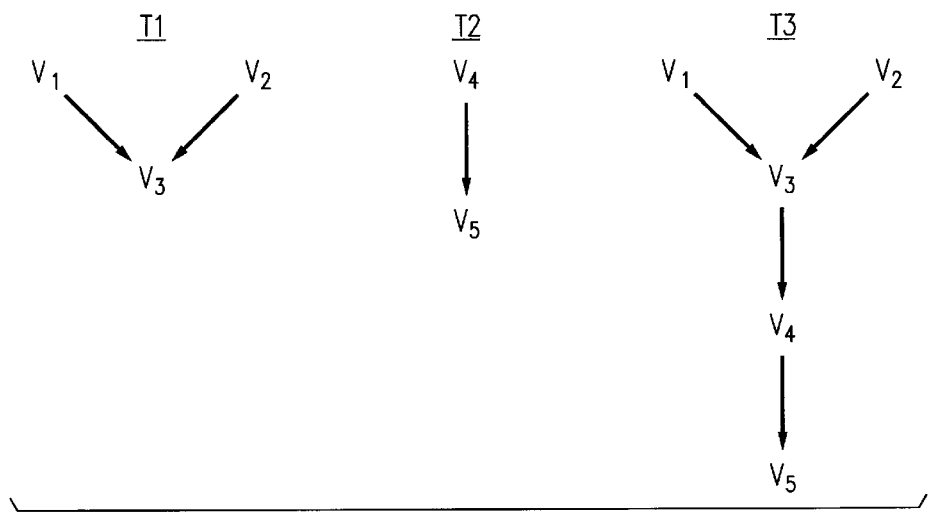
FIG. 5 shows another tree of verticies and the creation of an edge in this tree upon adding verticies to this tree.

Modifications are also required in the path table (Table 2) reflecting the creation of a new edge. To understand the needed modifications, consider the following example. Suppose there are 2 graph components, T1 and T2, and you wish to connect of T1 to of T2 in order to form T3 as in FIG. 5.

Let $V_i \otimes V_j$ symbolize the change in the path table representing an edge from $V_i$ to $V_j$.
Table 3 shows the corresponding path table for T1 and T2 and the records added to it representing $V_3 \otimes V_4$.

TABLE 3

| source | destination | | |
|--------|-------------|------|----|
| $V_1$ | $V_1$ | ⎫ | |
| $V_1$ | $V_3$ | | |
| $V_2$ | $V_2$ | ⎬ T1 | |
| $V_2$ | $V_3$ | | |
| $V_3$ | $V_3$ | ⎭ | |
| $V_4$ | $V_4$ | ⎫ | ⎫ |
| $V_4$ | $V_5$ | ⎬ T2 | |
| $V_5$ | $V_5$ | ⎭ | ⎬ T3 |
| $V_1$ | $V_4$ | ⎫ | |
| $V_1$ | $V_5$ | | |
| $V_2$ | $V_4$ | ⎬ $V_3 \otimes V_4$ | |
| $V_2$ | $V_5$ | | |
| $V_3$ | $V_4$ | | |
| $V_3$ | $V_5$ | ⎭ | ⎭ |

Figure 6:
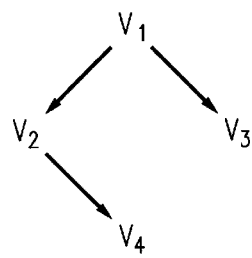
FIG. 6 illustrates a directed graph.

To compute $V_i \otimes V_j$, every source vertex where $V_i$ is a destination is crossed with every destination vertex where $V_j$ is a source. For the example in FIG. 5, this corresponds to:

$V_i \otimes V_j = \{V_1, V_2, V_3\} \times \{V_4, V_5\} = \{(V_1, V_4), (V_1, V_5), (V_2, V_4), (V_2, V_5), (V_3, V_4), (V_3, V_5)\}$ which is exactly $V_3 \otimes V_4$ as shown in path table 3. The 4GL SQL required to insert records into the path table (Table 3) corresponding to $V_i \otimes V_j$ is as follows.
insert into path
    select p1.source, p2.destination
    from path p1,path p2
    where p1.destination=$V_i$ and p2.source=$V_j$ Deleting an Edge in a Tree Deleting an edge in a tree from vertex $V_i$ to vertex $V_j$ requires a delete from the edge table (Table 1) as follows.
delete from edge where parent=$V_i$ and child=$V_j$ The same cross product used in supporting insertion of records into the path table is used to support deletion of records from the path table (Table 3). The corresponding 4GL SQL is as follows.
delete from path
    select p1.source, p2.destination
    from path p1, path p2
    where p1.destination=$V_i$ and p2.source=$V_j$ Deleting a Vertex in a Tree Deleting a vertex in a tree requires record deletes in the edge table (Table 1) as follows.
delete from edge where parent=$V_i$ or child=$V_i$ The records to delete in the path table (Table 3), reflecting the deletion of an edge from
$V_i$ to $V_j$, are derived as follows.
delete from path
    select p1.source, p2.destination
    from path p1, path p2
    where p1.destination=$V_i$ and p2.source=$V_i$ Directed Acyclic Graphs It can be shown that attempting to apply the tree maintenance algorithms to a directed acyclic graph in which the path between a source vertex and destination vertex is not unique causes the algorithms to break. For example, consider the directed acyclic graph shown in FIG. 6. If the path table already has unique indices and an attempt is made to create an edge from $V_3$ to $V_4$, the insert will fail because the tuple ($V_3$, $V_4$) already exists for the path $V_1$ $V_2$ $V_4$. If the path table is not uniquely indexed, the tuple ($V_1$, $V_4$) will appear twice in the Table 4 path table.

TABLE 4

| source | destination |
|--------|-------------|
| $V_1$ | $V_1$ |
| $V_2$ | $V_2$ |
| $V_3$ | $V_3$ |
| $V_4$ | $V_4$ |
| $V_1$ | $V_2$ |
| $V_1$ | $V_3$ |
| $V_2$ | $V_4$ |
| $V_3$ | $V_4$ |
| $V_1$ | $V_4$ |
| $V_1$ | $V_4$ |

A problem is revealed when attempting to delete the edge from $V_3$ to $V_4$. The delete edge process will delete both ($V_1$, $V_4$) tuples from the path table (Table 4), even though the path $V_1$ $V_2$ $V_4$ still exists. To address this problem for directed graphs in which a (source, destination) tuple is not unique, a path_count attribute is used. In the following sections, the use of path_count to support reflexive transitive closure maintenance of directed acyclic graphs is explained.

Creating a New vertex in a Directed Acyclic Graph

Creating a new vertex in a directed acyclic graph requires one record inserted into the path table (with path_count) as follows.
insert into path (source, destination, path_count) values ($V_i$, $V_i$, 1)

Creating an Edge in a Directed Acyclic Graph

Creating an edge in a directed acyclic graph between vertices $V_i$ and $V_j$ requires an insertion into the edge table as follows.

insert into edge (parent, child) values ($V_i$, $V_j$)

Once the path_count attribute is introduced, one can no longer simply insert records into the path table reflecting the creation of an edge. Instead, an update to increment the path_count of any pre-existing paths must be performed. In creating an edge from vertex $V_i$ to vertex $V_j$, an attempt is made to find all ($V_s$, $V_t$) tuples in the path table where $V_s$ is an ascendant of $V_i$ and $V_j$ is a descendant of $V_j$. For each ($V_s$, $V_t$) tuple found, its current path_count value is incremented by the path_count of ($V_s$, $V_i$) times the path_count of ($V_j$, $V_t$). The following SQL statements modify the path table in representing the creation of an edge from source vertex $V_i$ to destination vertex $V_j$.

update path p1
    from path p2, path p3
    set path_count=p1.path_count+(p2.path_count*p3.path_count)
    where p2.destination=$V_i$ and p1.source=p2.source
    and p3.source=$V_j$ and p1.destination=p3.destination The update handles pre-existing paths. To represent paths that are not pre-existing, inserts must be performed as follows.

insert into path
    select p1.source, p2.destination, p1.path_count*p2.path_count
    from path p1, path p2
    where p1.destination=$V_i$ and p2.source=$V_j$
    and not exists (select source, destination from path
        where source=p1.source and destination=p2.destination)

Deleting an Edge in a Directed Acyclic Graph

Deleting an edge in a directed acyclic graph from vertex $V_i$ to vertex $V_j$ requires a delete from the edge table as follows.

delete from edge where parent=$V_i$ and child=$V_j$

In deleting an edge from vertex $V_i$ to vertex $V_j$, an attempt is made to find all ($V_s$, $V_t$) tuples in the path table where $V_s$ is an ascendant of $V_i$ and $V_j$ is a descendant of $V_t$. For each ($V_s$, $V_t$) tuple found, its current path_count value is decremented by the path_count of ($V_s$, $V_i$) times the path_count of ($V_t$). The following SQL statements modify the path table in representing the deletion of an edge from source vertex $V_i$ to destination vertex $V_j$.

update path p1
    from path p2, path p3
    set path_count=p$_1$.path_count-(p2.path_count*p3.path_count)
    where p2.destination=$V_i$ and p1.source=p2.source
    p3.source=$V_j$ and p1.destination=p3.destination Having decremented the path_count of all affected paths, next all path tuples where path_count=0 are deleted, reflecting the deletion of paths. The 4GL SQL statement to perform this is as follows.

delete from path
    where source in (select source from path where destination=$V_i$)
    and destination in (select destination from path where source=$V_j$)
    and path_count=0

Deleting a Vertex in a Directed Acyclic Graph

Deleting a vertex in a directed acyclic graph requires record deletes in the edge table as follows.

delete from edge where parent=$V_i$ or child=$V_i$

The records to delete in the path table are equivalent to the deleting an edge from $V_i$ to $V_i$ as follows.

update path p1
    from path p2, path p3
    set path_count=p1.path_count-(p2.path_count*p3.path_count)
    where p2.destination=$V_i$ and p1.source=p2.source
    and p3.source=$V_i$ and p1.destination=p3.destination delete from path
    where source in (select source from path where destination=$V_i$)
    and destination in (select destination from path where source=$V_i$)
    and path_count=0

Directed Cyclic Graphs

Figure 7:
FIG. 7 illustrates a directed cyclic graph.

It can be shown that the procedures to maintain reflexive transitive closure for directed acyclic graphs break when applied to directed cyclic graphs. Consider the directed graph shown in FIG. 7 which shows a graph with two vertices ($V_1$, $V_2$) and a directed path from $V_1$ to $V_2$. The corresponding path table (Table 5) appears as follows.

TABLE 5

| source | destination | path_count |
|---|---|---|
| $V_1$ | $V_1$ | 1 |
| $V_2$ | $V_2$ | 1 |
| $V_1$ | $V_2$ | 1 |

Figure 8:
FIG. 8 illustrates the directed cyclic graph shown in FIG. 7 after an additional edge has been created.

Now assume an edge from $V_2$ to $V_1$ as shown in FIG. 8 is added to FIG. 9. The path table corresponding to FIG. 8 will appear as follows in Table 6.

TABLE 6

| source | destination | path_count |
|---|---|---|
| $V_1$ | $V_1$ | 2 |
| $V_2$ | $V_2$ | 2 |
| $V_1$ | $V_2$ | 2 |
| $V_2$ | $V_1$ | 4 |

Note that even though the graph in FIG. 9 visually appears symmetric, the path table shows a bias in path_count for tuple ($V_2$, $V_1$). This looks bothersome and, indeed, becomes troublesome if the edge from $V_2$ to $V_1$ is deleted. The corresponding path table (Table 7) will appear as follows.

TABLE 7

| source | destination | path_count |
|---|---|---|
| $V_1$ | $V_1$ | -2 |
| $V_2$ | $V_2$ | -2 |
| $V_1$ | $V_2$ | -2 |

The expectation was to assume that the operations of creating an edge from $V_2$ to $V_1$ and deleting the edge from $V_2$ to $V_1$ were inverse operations that would leave the path table as shown in Table 5. The fact that the state of the path table is different indicates that the maintenance procedures for directed acyclic graphs don't work for directed cyclic graphs. This is shown as a limit of the present invention in that maintenance of the reflexive transitive closure for directed cyclic graphs is beyond the immediate scope of the present invention.

Graph Representation Analysis

If a directed graph contains N vertices, the number of edges is bound by the following.

$$N-1 <= \#\text{of edges} <= N^2$$

The number of (source, destination) vertex pairs required to represent the reflexive transitive closure of a directed graph containing N vertices is bound by the following.

$$2N-1 <= \#\text{of (source, destination) vertex pairs} <= N^2$$

The number of (source, destination) vertex pairs required to represent the reflexive transitive closure of a directed acyclic graph containing N vertices is bound by the following.

$$2N-1 <= \#\text{of (source, destination) vertex pairs} <= (N+1)(N)/2$$

For a decomposition directed acyclic graph of N vertices in which the length between any (source, destination) vertex pair is unique and less than K, the number of (source, destination) vertex pairs required to represent the reflexive transitive closure is bound by the following.

$$2N-1 <= \#\text{of (source, destination) vertex pairs} <= [(N/K)^2] \cdot K(K-1)/2 + N$$

Automation of Path Table Maintenance

Most commercial relational databases support rules and procedures for automation of path maintenance. Each of the path table SQL statements described previously can be encapsulated into SQL procedures, all in accordance with the present invention. One way to automate is to define database rules that are activated whenever a vertex or edge is added or deleted. The activation of a rule then causes the appropriate path table maintenance procedures, also known as update procedures, to start executing. For instance, if the following rule is defined in a database system, such as Ingres®, the rule is activated into action whenever a record is inserted into the edge table.

```
create rule edge_insert after insert of edge table
    execute procedure path.insert (parent=NEW.parent,
    child=NEW.child)
with path_insert also defined in a database system (such as Ingres)
as follows:
create procedure path_insert (parent integer4, child integer4)
BEGIN
    insert into path
        select p1.source, p2.destination
        from path p1, path p2
        where p1.destination=:parent
        and p2.source=:child;
END;
```

While the invention has been particularly illustrated and described with reference to preferred embodiments thereof, it will be understood by those skilled in the art that various changes in form, details, and applications may be made therein. It is accordingly intended that the appended claims shall cover all such changes in form, details and applications which do not depart from the true spirit and scope of the invention.

What is claimed is:

1. A method, for use in a computer having a processor, a plurality of storage elements and a display device, for determining a transitive closure between two verticies of a tree graph in standard SQL comprising the steps of:

determining all verticies of said tree graph;

determining an edge table from all of the verticies;

deriving a path table from said verticies and said edge table, and from said path table determining at least one transitive closure path between said two if such transitive closure exists.

2. A method according to claim 1, wherein upon a vertex being added to the tree graph said path table deriving step further comprises:

inserting into said path table a source vertex and a destination vertex of said vertex which is added.

3. A method according to claim 1, wherein upon an edge being added to the tree graph said path table deriving step further comprises:

inserting into said path table a source vertex and a destination vertex.

4. A method according to claim 1, wherein upon an edge being removed from the tree graph said path table deriving step further comprises:

deleting from said edge table an edge between parent vertex $V_i$ and child vertex $V_j$; and deleting from said path table vertex $V_i$ and vertex $V_j$.

5. A method according to claim 1, wherein upon a vertex being removed from the tree graph said path table deriving step further comprises:

recording deletion of either said parent vertex or said child vertex from said edge table in the edge table by deleting from edge table the edge where parent is $V_i$ or child is $V_i$;

recording deletions in the path table the deletion of an edge from vertex $V_i$ to vertex $V_i$.

6. A method, for use in a computer having a processor, a plurality of storage elements and a display device, for determining a transitive closure between two verticies of a directed acyclic graph in standard SQL comprising the steps of:

determining all verticies of said directed acyclic graph;

determining an edge table from all of the verticies;

deriving a path table from said verticies and said edge table, and from said path table determining at least one transitive closure path between said two if such transitive closure exists.

7. A method according to claim 6, wherein upon a vertex being added to the directed acyclic graph said path table deriving step further comprises:

inserting into said path table a source vertex and a destination vertex of said vertex which was added and a path count quantity.

8. A method according to claim 6, wherein upon an edge being added to the directed acyclic graph said path table deriving step further comprises:

inserting into said path table a source vertex and a destination vertex of said added edge.

9. A method according to claim 6, wherein upon an edge being removed from the directed acyclic graph said path table deriving step further comprises:

deleting from the edge table an edge between parent vertex $V_i$ and child vertex $V_j$;

finding all $(V_s, V_t)$ tuples in the path table where $V_s$ is an ascendant of $V_i$ and $V_j$ is a descendant of $V_t$ and for each $(V_s, V_t)$ tuple found decrementing a current path_count value thereof by a path_count of $(V_s, V_i)$ times the path_count of $(V_t)$; and deleting any path tuples where path_count is 0.

10. A method according to claim 6, wherein upon a vertex being removed from the directed acyclic graph said path table deriving step further comprises: recording in the edge table the deletion of an edge between parent vertex $V_i$ or child vertex $V_i$.

* * * * *